Patented Nov. 25, 1930

1,782,761

UNITED STATES PATENT OFFICE

JOHN T. McCROSSON, OF PORT AU PRINCE, HAITI

METHOD OF CANNING PINEAPPLE AND PRODUCT THEREOF

No Drawing. Application filed February 8, 1929. Serial No. 338,622.

The present invention relates to a new and improved method of canning pineapple, and to the product of said method, with saving of costs of production and transportation, which is and will be of great value to the canner and a benefit to the consuming public.

The present or old method of canning pineapple is to pare, core and slice. The slices are put in cans and hot syrup is added to fill the cans. The filled but unsealed cans are conveyed through an exhaust box in which either steam jets play on the sides of the cans, or the cans are partly submerged in hot water; the object of this being to heat the contents before sealing, thereby driving out some of the air and creating a partial vacuum in the can after it has cooled.

After sealing the cans are placed in a retort and processed for a definite time after which they are cooled.

By my method the pineapples are pared, cored and sliced as is now done, then the slices are saturated with a sirup, by placing the slices in a mesh basket which is submerged entirely in a warm sirup in a tank that can be closed air tight. A high vacuum is drawn in the tank which removes the air from the slices, the vacuum is maintained only a few minutes, and air is then admitted and atmospheric pressure forces the sirup into the slices thoroughly saturating them.

The basket is removed and slices are drained to remove substantially all but the saturating sirup and put into cans or jars without adding any sirup. The containers are now sealed with a high vacuum.

The cans or jars are now placed in a retort and processed at a heat sufficient to sterilize the product, say at about 180 degrees F., but less heat and time are required to sterilize as there is no sirup to be heated. In this manner the slices are sterilized in their own moisture and steam. After processing, the cans are cooled but here again the time is less, since there is no heavy sirup in the can to be cooled.

While I mentioned above that the pineapples be put in a mesh basket and submerged in a tank containing sirup, I do not limit myself to this means only, as it is quite possible and preferable to achieve the same result in a continuous machine having a long box which is vacuum-tight having a rotary valve at each end and a conveyer inside of the box. The cans containing the slices enter the vacuum while passing along; then just before the cans leave the vacuum box they are filled with syrup, after which the cans would leave the box by means of the exit valve.

I can shorten the process in most cases by subjecting the pineapple, in slices or crushed, to the action of the vacuum, the fruit being placed, for that purpose, in a suitable receptacle from which the air is exhausted to about 28½ or 29 inches of vacuum.

By subjecting the pines to vacuum without being covered with syrup, a more complete removal of air is possible, since the air would not have to be drawn through the sirup.

Upon leaving the vacuum box, the pines in the sirup would be subjected to atmospheric pressure; then the sirup would be drained off, and used again. The cans containing the drained pines would pass directly to vacuum sealing machine, which removes the air from the can and then hermetically seals it.

The advantages of my method are that all slices have the same appearance, all are saturated, which imparts a color that is highly desirable, and a better flavor of the product results since it was cooked in the absence of any air, so no oxidation could take place.

As there is no sirup in the can all the flavor is retained in the pineapples. The product is cooked in steam produced from its own moisture and juice during the sterilizing. The pines are sterilizing quicker than if they were in heavy sirup which would have to be elevated to a higher sterilizing point. The same is true of cooling the cans after cooking, the cooling being more quickly accomplished, and so as to eliminate any danger of overcooking such as is known as stack burning.

As illustrative of the advantages and economies obtained by my process it may be stated that the weight of a case of 24 cans, No. 2½ size, would be about 15 pounds less, and this saving of freight is important. Further as I use no packing sirup there would be a saving of about 4½ pounds of sugar per case.

When smaller or larger sized cans are used this saving in weight and sugar will be proportionate.

I claim:

1. A method of canning pineapple, which consists in removing air from the same, substituting sirup in the interstices of the fruit formerly occupied by the air, then removing substantially all of the sirup excepting that within the interstices of the fruit, then sealing the fruit in vacuum without additional syrup, and then heating and sterilizing the fruit while in said vacuum by the aid of steam produced from the juices of the fruit.

2. The method of canning pineapple which consists in covering the pineapple slices with syrup in a closed container, removing air from the slices by exhausting the container in a relatively high vacuum, then admitting air to the container to force the syrup into and to saturate the evacuated cells of the fruit, then draining the fruit to remove substantially all but the saturating syrup, then placing the saturated fruit slices into containers without additional syrup or moisture and sealing the latter under vacuum, and then heating the fruit while in said vacuum thus producing steam in the container and thereby sterilizing the interior of the fruit penetrated by the syrup.

3. A food product consisting of pieces of pineapple enclosed within a vacuumized container, the evacuated cells of said pieces being saturated with syrup in place of the removed air, and sterilized by heat and by the steam derived from the juices of the fruit and from the saturating syrup, the container being substantially void of free liquid excepting that derived from condensation of said steam, the resulting product possessing desirable qualities of the fresh fruit.

Signed at Washington, in the District of Columbia, this 7th day of February, A. D. 1929.

JOHN T. McCROSSON.